United States Patent
Blankenship et al.

(10) Patent No.: US 7,479,185 B2
(45) Date of Patent: Jan. 20, 2009

(54) REFLECTIVE CRACK RELIEF LAYER THAT IS PERMEABLE

(76) Inventors: Phillip B. Blankenship, 606 N. Stratford La., Wichita, KS (US) 67206; Richard K. Steger, 4234 N. Mission, Wichita, KS (US) 67222; James D. Campbell, 8711 S. Meridian Rd., Sedgwick, KS (US) 67135

( * ) Notice: Subject to any disclaimer, the term of this patent is extended or adjusted under 35 U.S.C. 154(b) by 236 days.

(21) Appl. No.: 11/195,900

(22) Filed: Aug. 3, 2005

(65) Prior Publication Data

US 2007/0028802 A1  Feb. 8, 2007

(51) Int. Cl.
*C08L 95/00* (2006.01)
*C09D 195/00* (2006.01)

(52) U.S. Cl. .................................. 106/284.01
(58) Field of Classification Search ............. 106/284.01
See application file for complete search history.

(56) References Cited

U.S. PATENT DOCUMENTS

| | | | |
|---|---|---|---|
| 5,078,543 | A | 1/1992 | Terrel |
| 6,830,408 | B1 | 12/2004 | Blankenship et al. |
| 2005/0022696 | A1 | 2/2005 | Blankenship et al. |

OTHER PUBLICATIONS

Standard Practice for Superpave Volumetric Design For Hot-Mix Asphalt (HMA); AASHTO Designation: R 35-04; pp. R 35-1 through R 35-13.
ASTM Designation D 3637—84 (Reapproved 1991); Standard Test Methods for Permeability of Bituminous Mixtures; pp. 364-369.
J.J.E. Liebenberg et al: Asphalt Mix Design and Construction: A Selection of Possible Pitfalls; (Sep. 16, 2004), pp. 1-12; XP002389166; Sun City, South Africa; http://asac.csir.co.za/capsa/Documents/035.pdf.

*Primary Examiner*—David M Brunsman

(57) ABSTRACT

A design method for making a bituminous mixture that is used to form a vapor-permeable layer of pavement is provided. This design procedure includes preparing one or more bituminous mixture test specimens, measuring the performance of these specimens, and selecting a desirable bituminous mixture for paving that is vapor-permeable based on the performance of the specimens. Another aspect of the present invention is the selected bituminous mixture, which includes aggregate and a bituminous binder. The aggregate should be selected such that no more than about 5% by mass of the aggregate and preferably no more than about 3.5% by mass of the aggregate is able to pass through a 75 μm sieve. The selected bituminous mixture should have an Air Permeability Value that is at least about 8 $cm^2$ so as to reduce its propensity for blistering during and after construction. Still further, the selected bituminous mixture should have desirable fatigue resistance and should be substantially water-impermeable.

34 Claims, No Drawings

REFLECTIVE CRACK RELIEF LAYER THAT IS PERMEABLE

CROSS-REFERENCE TO RELATED APPLICATIONS

Not Applicable.

STATEMENT REGARDING FEDERALLY SPONSORED RESEARCH OR DEVELOPMENT

Not applicable.

BACKGROUND OF THE INVENTION

1. Field of the Invention

The present invention relates to a bituminous mixture for paving applications. More specifically, this bituminous mixture provides a paved layer with increased vapor permeability while the layer remains substantially moisture impervious and retains its ability to retard the formation of reflective cracks.

2. Description of Related Art

When pavements deteriorate, they may be overlaid with hot mix asphalt (HMA) to repair them. When designing an overlay, the rate of crack propagation through the overlay, the rate of deterioration of the reflective crack, and the amount of water that can infiltrate through the crack must be considered. One disadvantage with such thicker HMA overlays is that cracks in the old pavement reflect through the new overlay. To relieve this reflective cracking, one option is to place thicker overlays. Another disadvantage with conventional HMA overlays is that they are water permeable allowing water to enter the base. A third disadvantage with these overlays is that they typically have a low strain tolerance and a low resistance to reflective cracking.

Asphalt binders that display the ability to undergo creep or stress relaxation at low temperatures in order to minimize the potential for thermal and reflective cracking may be created. The disadvantage with such binders is that they are highly ductile and thus, roads created with them tend to rut.

Asphalt binders with a high shear modulus that resist rutting at high temperatures also may be created. The disadvantage with such binders is that they tend to be brittle at low temperatures, and thus, roads created with them tend to crack. Typical asphalt binders formulated for pavement applications usually display either high shear modulus at high temperatures or high ductilities at low temperatures but not both.

Other reflective crack control measures that are used to rehabilitate distressed pavements include placing Stress-Absorbing Membrane Interlayers (SAMI), placing grids or fabrics on a surface before placing HMA, break and seat of the pavement, rubblization of the pavement, and reconstruction. Some potential disadvantages with these processes are that they can be cost prohibitive, ineffective, difficult to recycle or difficult to construct. Another disadvantage with these processes is that if the road is not reconstructed, it may still have cracking problems.

In order to solve some of the problems discussed above, interlayers have been created that have the ability to relax stress while maintaining stability. An example of such an interlayer is described in U.S. Pat. No. 6,830,408, which is incorporated by reference in its entirety. Such an interlayer has an aggregate structure that includes a large amount of fine aggregate. More specifically, 6 to 14% of aggregate used in such an interlayer is able to pass through a No. 200 sieve and 100% of aggregate is able to pass through a 9.5 mm sieve. While such an interlayer is impermeable to water so as to prevent surface water from penetrating and collecting below it, it has the disadvantage of being substantially impermeable to vapor. When such an interlayer is placed on Portland Cement Concrete (PCC) or another paved surface, the interlayer has the potential to trap vapor underneath it. As changes occur in climatic and environmental conditions, this causes the PCC to release moisture or vent. The interlayer then rises creating a blister. This causes overlays on top of this interlayer also to rise and blister. Through experimentation, the inventors of the present invention have determined that water vapor is a predominant component of the vapor that creates the blisters.

In order to overcome these disadvantages, a bituminous mixture that is able to form a layer that remains substantially moisture impervious and retains its ability to retard the formation of reflective cracks while having increased vapor permeability is needed. This bituminous mixture should be able to be used to create various layers of a roadway including base layers, interlayers, and overlays.

BRIEF SUMMARY OF THE INVENTION

It is an object of the present invention to provide a bituminous mixture for paving applications that has fatigue resistance so as to retard the formation of reflective cracks and that has increased vapor permeability so as to aid in preventing blisters from forming under the paved layer.

The foregoing and other objects are achieved by a bituminous mixture that may be used to form a vapor-permeable paved layer. This bituminous mixture has desirable vapor permeability while being able to provide good fatigue resistance. It includes aggregate and a bituminous binder. The aggregate should be selected such that no more than about 5% by mass of the aggregate and preferably no more than about 3.5% by mass of the aggregate is able to pass through a 75 µm (No. 200) sieve. The bituminous mixture should have an Air Permeability Value (K) that is at least about 8 cm$^2$ so as to reduce its propensity for blistering during and after construction.

Another aspect of the present invention is a design method for making this bituminous mixture that is used to form a vapor-permeable layer of pavement. This design procedure includes preparing one or more bituminous mixture test specimens with desirable amounts of air voids; measuring the performance of these specimens using a performance test such as, but not limited to, a permeability test, a fatigue test, an air voids test, or combinations thereof; and selecting a desirable bituminous mixture for paving that is vapor-permeable based on the performance of the specimens.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF PREFERRED EMBODIMENT

A design method for making a paved layer that has fatigue resistance while being vapor-permeable is described. More specifically, the layer should be relatively impermeable to water while being relatively permeable to vapor.

A method of selecting a bituminous mixture for making a layer of a roadway is provided. This method includes preparing test specimens of one or more bituminous mixtures, constructing various performance tests on the bituminous mixtures, and selecting a bituminous mixture having desirable qualities for making a vapor-permeable layer based on the results of the performance tests that were conducted on the specimens. The selected bituminous mixture must meet certain criteria, and the aggregate chosen for use in the selected bituminous mixture must meet certain criteria.

The aggregate selected for inclusion in the bituminous mixture that undergoes performance screening should include no more than about 5% by mass of aggregate that is able to pass through a 75 µg (No. 200) sieve. Preferably, no more than about 4.5% by mass of aggregate is able to pass through a 75 µm sieve. More preferably, no more than about 4% by mass of aggregate is able to pass through a 75 µm sieve. Most preferably, no more than about 3.5% by mass of aggregate in the bituminous mixture is able to pass through a 75 µg sieve. Preferably, no more than about 7% by mass of the aggregate in the bituminous mixture is able to pass through a 150 µm (No. 100) sieve. More preferably, no more than about 6% by mass of the aggregate is able to pass through a 150 µg sieve. Most preferably, no more than about 5% by mass of the aggregate is able to pass through a 150 µg sieve. Preferably, more than about 25% by mass of the aggregate is able to pass through a 600 µg (No. 30) sieve and more than about 45% by mass of the aggregate is able to pass through a 1.18 mm (No. 16) sieve. Preferably, more than about 70% by mass of the aggregate is able to pass through a 2.36 mm (No. 8) sieve. More preferably, more than about 80% by mass of the aggregate is able to pass through a 2.36 mm sieve. Most preferably, more than about 85% by mass of the aggregate is able to pass through a 2.36 mm sieve. Preferably, at least about 90% by mass of the aggregate is able to pass through a 9.5 mm sieve. Substantially all of the aggregate selected should be able to pass through a 12.5 mm sieve. The aggregate may include, but is not limited to, mineral aggregates, such as sand, stone, and/or lime, and may be crushed and/or rounded.

One or more bituminous mixtures may be created from the selected aggregate. The binder used to make the bituminous mixture should provide good resistance to rutting and cracking. Preferably, polymer-modified or elastomer-modified binders are used. Binders as described in U.S. Pat. No. 6,830,408 may be used. Preferably, multiple mixtures are made so that the effects of different proportions of various aggregate gradations, different binders, and different binder amounts can be observed through the performance tests conducted.

Preferably, the bituminous mixture includes at least about 7% by weight bituminous binder. More preferably, it includes at least about 8% by weight bituminous binder. Most preferably, it includes at least about 9% by weight bituminous binder.

Specimens are created from the proposed bituminous mixtures. These specimens should have approximately the same amount of air voids as the amount desired in the layer of pavement to be constructed.

Physical properties of the specimens of bituminous mixtures are measured, and performance tests are performed. At least one performance test is conducted or physical property is measured on at least one of the bituminous mixtures that has been made. This performance test may be a fatigue resistance test or a vapor permeability test. Preferably, a Flexural Beam Fatigue test is performed to measure fatigue resistance. Preferably, the vapor permeability test is based on measuring a sample that has a percentage of air voids that is substantially equal to the desired percentage of air voids in the layer of pavement to be created. Preferably, the vapor permeability test is an Air Permeability test. Preferably, the Air Permeability test is based on measuring a sample that is 2.5 cm in height and 10 cm in diameter. Most preferably, the Standard Test Methods for Permeability of Bituminous Mixtures (ASTM D 3637), which measures the rate at which air can be forced or drawn through a bituminous mixture, is followed. Physical qualities measured or calculated may include air voids, bitumen film thickness, voids filled with bitumen, voids in the mineral aggregate (VMA), and dust to binder ratio (D/B). VMA may be measured no matter what material(s) is used as the aggregate, whether mineral aggregate or not. Preferably, dust to binder ratio is calculated by following the volumetric design procedures outlined in section 9.3.6 of AASHTO R 35-04, where this ratio is defined as dust to estimated effective binder content. Preferably, more than one of the physical qualities discussed above is measured or calculated and all of the performance tests discussed above are conducted on the test specimens. Most preferably, all of the measurements discussed above are taken and all of the performance tests discussed above are conducted on the test specimens.

Based on the performance tests, measurements, and calculations discussed above, a bituminous mixture for making a layer of pavement is selected. If a desirable bituminous mixture was tested, the exact same bituminous mixture may be selected for making the layer. If an undesirable bituminous mixture was tested, then the aggregate gradation composition, binder amount and/or binder composition should be modified so as to compensate for the undesirable performance or physical property of the tested specimen of bituminous mixture.

The selected bituminous mixture should include an aggregate and binder constituency that creates at least about 3% air voids in the bituminous mixture based on 50 gyrations compaction of a 100 mm sample. Preferably, the bituminous mixture has at least about 4.0% air voids. More preferably, the bituminous mixture has at least about 4.5% air voids. Even more preferably, the bituminous mixture has at least about 5% air voids. Most preferably, at least about 7% air voids are created in the bituminous mixture.

Preferably, the selected bituminous mixture has an Air Permeability Value of at least about 8 cm$^2$. More preferably, the selected mixture has an Air Permeability Value of at least about 10 cm$^2$. More preferably, the selected mixture has an Air Permeability Value of at least about 12 cm$^2$. Most preferably, the selected mixture has an Air Permeability Value of at least about 15 cm$^2$.

The selected bituminous mixture should have a Flexural Beam Fatigue at 2000 microstrains, 10 Hz, and 20° C. of at least about 5000 cycles. More preferably, the Flexural Beam Fatigue of the bituminous mixture is at least about 35,000 cycles. Most preferably, the Flexural Beam Fatigue of the bituminous mixture is at least about 100,000 cycles.

No more than about 5% by mass of the aggregate included in the selected bituminous mixture should be able to pass through a 75 µm sieve. Preferably, no more than about 4.5% by mass of aggregate is able to pass through a 75 µg sieve. More preferably, no more than about 4% by mass of aggregate is able to pass through a 75 µm sieve. Most preferably, no more than about 3.5% by mass of aggregate in the bituminous mixture is able to pass through a 75 µm sieve. Preferably, no more than about 7% by mass of the aggregate in the bituminous mixture is able to pass through 150 µm sieve. More preferably, no more than about 6% by mass of the aggregate is able to pass through a 150 µg sieve. Most preferably, no more than about 5% by mass of the aggregate is able to pass through 150 µm sieve. Preferably, more than about 25% by mass of the aggregate is able to pass through a 600 μm sieve and more than about 45% by mass of the aggregate is able to pass through a 1.18 mm sieve. Preferably, more than about 70% by mass of the aggregate is able to pass through a 2.36 mm sieve. More preferably, more than about 80% by mass of the aggregate is able to pass through a 2.36 mm sieve. Most preferably, more than about 85% by mass of the aggregate is able to pass through a 2.36 mm sieve. Preferably, at least about 90% by mass of the aggregate is able to pass through a 9.5 mm sieve. Substantially all of the aggregate selected should be able to pass through a 12.5 mm sieve. The aggregate in the selected bituminous mixture may include, but is not limited to, mineral aggregates, such as sand, stone, and/or lime, and may be crushed and/or rounded.

The selected bituminous mixture should. have no more than about 70% voids filled with bitumen. Preferably, it has no more than about 65% voids filled with bitumen. In some instances, it has no more than about 60% voids filled with bitumen. Most preferably, it has about 65% voids filled with bitumen for optimal fatigue resistance.

The aggregate used in the selected bituminous mixture should have at least about 18% VMA. Preferably, it has at least about 20% VMA, and most preferably, it has at least about 22% VMA.

The dust to bitumen ratio (D/B) of the selected bituminous mixture should be no more than about 0.9. Preferably, the dust to bitumen ratio is no more than about 0.7. Most preferably, the dust to bitumen ratio is no more than about 0.5.

The selected bituminous mixture should have a bitumen film thickness of at least about 7 μm. Preferably, the film thickness of the selected bituminous mixture is at least about 8 μg, and most preferably, it is at least about 9 μm.

Another aspect of the present invention is a bituminous mixture that includes aggregate and a bituminous binder. The aggregate should have the characteristics of the selected aggregate discussed above, and the bituminous mixture has at least some of the physical properties and the performance characteristics of the selected bituminous mixture discussed above. Preferably, the bituminous mixture has all of the physical properties and performance characteristics of the selected bituminous mixture discussed above. This bituminous mixture is able to be used to make a layer of pavement that has good fatigue resistance while being substantially water-impermeable and vapor-permeable.

There is an inverse relationship between the air voids in a bituminous mixture and fatigue resistance of that mixture. There are many references that describe high air void bituminous mixes that are fatigue intolerant. Also, bituminous mixes have been made that have excellent fatigue resistance but very low air voids so as to be essentially vapor impermeable. Until the present invention, the inverse relationship between air voids and fatigue resistance was thought to be an immutable inherent property. In the present invention, it was surprising to find that by carefully defining the gradations of aggregate and amount of binder that is used, a bituminous mixture with desirable permeability and fatigue resistance can be created.

One key aspect in developing the present invention was using an atypical dust to bitumen (D/B) target. Typical design guidelines use a D/B ratio of 1.0 as a minimum and increase the ratio to 1.2 or even as high as 2.0. However, in the present invention, as this ratio was lowered to 0.9, 0.7, 0.5 and below, the results were surprising.

By creating a very large amount of air voids in an aggregate structure and then filling a large portion of those voids with bitumen, a bituminous mixture of the present invention may be created so long as the air voids are constructed carefully. The amount of aggregate able to pass through 75 μm, 150 μm and 2.36 mm sieves is important to constructing the air void structure of the present invention. Also, the total amount of air voids is critical. Too many air voids will limit fatigue resistance and too few air voids will compromise permeability.

In one embodiment of the present invention, the bituminous mixture has an Air Permeability Value that is at least about 8 cm$^2$ and a Flexural Beam Fatigue of at least about 5000 cycles at 2000 microstrains, 10 Hz, and 20° C. More preferably, both the Air Permeability Value and the Flexural Beam Fatigue are greater than the numbers as described above. More preferably, the bituminous mixture has an Air Permeability Value that is at least about 10 cm$^2$ and a Flexural Beam Fatigue of at least about 35,000 cycles at 2000 microstrains, 10 Hz and 20° C. Even more preferably, the bituminous mixture has an Air Permeability Value that is at least about 12 cm$^2$ and a Flexural Beam Fatigue of at least about 100,000 cycles at 2000 microstrains, 10 Hz and 20° C. Most preferably, the bituminous mixture has an Air Permeability Value that is at least about 15 cm$^2$. Preferably, this bituminous mixture has a dust/bitumen ratio that is no more than about 0.9, preferably, no more than about 0.7, and most preferably, no more than about 0.5. Still further, preferably, no more than about 5% by mass of the aggregate in the bituminous mixture is able to pass through a 75 μm sieve. Preferably, at least about 7% by weight of the bituminous mixture is the binder. More preferably, at least about 8% by weight of the bituminous mixture is the binder, and most preferably, at least about 9% by weight of the bituminous mixture is the binder. Preferably, no more than about 5% by mass of the aggregate is able to pass through a 75 μg sieve, and more preferably, no more than about 3.5% by mass of the aggregate is able to pass through a 75 μm sieve. Preferably, more than about 70% of the aggregate is able to pass through a 2.36 mm sieve. More preferably, more than about 80% of the aggregate is able to pass through a 2.36 mm sieve. Most preferably, more than about 85% of the aggregate is able to pass through a 2.36 mm sieve. The bituminous mixture of this embodiment should have a film thickness that is at least about 7 μm, preferably, at least about 8 μm, and most preferably, at least about 9 μm. The bituminous mixture of this embodiment should have at least about 3% air voids, preferably, at least about 5% air voids, and most preferably, at least about 7% air voids.

In another embodiment of the present invention, no more than 5% by mass of the aggregate in the bituminous mixture is able to pass through a 75 μm sieve, more than about 70% by mass of the aggregate is able to pass through a 2.36 mm sieve, and the mixture has a Flexural Beam Fatigue that is at least about 5000 cycles at 2000 microstrains, 10 Hz and 20° C. Preferably, no more than 3.5% by mass of the aggregate in the bituminous mixture is able to pass through a 75 μm sieve, no more than about 7% by mass of the aggregate is able to pass through a 150 μg sieve, no more than about 25% by mass of the aggregate is able to pass through a 600 μm sieve, more than about 80% by mass of the aggregate is able to pass through a 2.36 mm sieve, and at least about 90% by mass is able to pass through a 9.5 mm sieve. More preferably, more than about 85% of the aggregate in the bituminous mixture of this embodiment is able to pass through a 2.36 mm sieve. Preferably, this mixture has at least about 3% air voids, at least about 7% by weight binder, and has no more than about 70% voids filled with bitumen. More preferably, this mixture has at least about 5% air voids and no more than about 60% voids filled with bitumen. Most preferably, this mixture has at least about 7% air voids and no more than about 65% voids filled with bitumen. The bituminous mixture of this embodiment has a dust/bitumen ratio that is no more than about 0.9, preferably, no more than about 0.7, and most preferably, no more than about 0.5. The binder in the bituminous mixture of this embodiment has a film thickness of at least about 7 µm, preferably, a film thickness of at least about 8 µg, and most preferably, a film thickness of at least about 9 µm. The bituminous mixture of this embodiment has at least about 18% VMA, preferably, at least about 20% VMA, and most preferably, at least about 22% VMA.

In another embodiment of the present invention, no more than about 5% of the aggregate in the bituminous mixture is able to pass through a 75 µm sieve, and the bituminous mixture has at least about 3% air voids and an Air Permeability Value of at least about 8 cm$^2$. Preferably, this mixture has at least about 5% air voids. Most preferably, this mixture has at least about 7% air voids. Preferably, no more than about 7% by mass of the aggregate is able to pass through a 150 µm sieve and more than about 70% by mass of the aggregate is able to pass through a 2.36 mm sieve. More preferably, more than about 80% by mass of the aggregate is able to pass through a 2.36 mm sieve. Preferably, the bituminous mixture of this embodiment is at least about 7% by weight binder, and more preferably, at least about 8% by weight binder. Preferably, the bituminous mixture of this embodiment has a Flexural Beam Fatigue of at least about 5,000 cycles, more preferably, 35,000 cycles, and most preferably, 100,000 cycles at 2000 microstrains, 10 Hz, and 20° C. The bituminous mixture of this embodiment has no more than about 70% voids filled with bitumen and preferably no more than about 65% voids filled with bitumen. It has a film thickness of at least about 7µg and preferably at least about 9 µg. It has a dust/bitumen ratio that is no more than about 0.9.

Another embodiment of the present invention is a method of making a bituminous mixture that includes selecting aggregate wherein no more than about 5% by mass of the aggregate is able to pass through a 75 µm sieve and mixing a bituminous binder with the aggregate to form a bituminous mixture that has at least about 3% air voids, substantial vapor permeability, and a Flexural Beam Fatigue that is at least about 5000 cycles at 2000 microstrains, 10 Hz and 20° C. Preferably, more than about 85% by mass of the aggregate is able to pass through a 2.36 mm sieve, at least about 7% by weight of the mixture is binder, and the bituminous mixture has an Air Permeability Value that is at least about 8 cm$^2$ and a film thickness of at least about 7 µm.

Another embodiment of the present invention is a method of selecting a bituminous mixture for making a layer for a roadway that includes providing aggregate wherein no more than about 5% by mass of the aggregate is able to pass through a 75 µm sieve, providing at least one bituminous mixture comprised of a bituminous binder and the aggregate, performing a fatigue test and a permeability test on the mixture, and selecting a bituminous mixture for the layer after performing the tests based on the fatigue and permeability performance of the tested bituminous mixture. The selected bituminous mixture should have at least about 3% air voids and allow for substantial vapor permeability. Preferably, at least about 90% by mass of the aggregate in the selected bituminous mixture is able to pass through a 9.5 mm sieve, and substantially all of the aggregate in the selected bituminous mixture is able to pass through a 12.5 mm sieve. Preferably, the selected bituminous mixture has an Air Permeability Value that is at least about 8 cm$^2$, more preferably, at least about 10 cm$^2$, and most preferably, at least about 12 cm$^2$. Preferably, the selected bituminous mixture has a Flexural Beam Fatigue of at least about 5000 cycles at 2000 microstrains, 10 Hz, and 20° C., more preferably, at least about 35,000 cycles, and most preferably, at least about 100,000 cycles. Preferably, the amount of voids filled with bitumen in the at least one bituminous mixture is determined before the selection step and selecting the bituminous mixture is based on the determination. Preferably, the amount of air voids in the at least one bituminous mixture is determined before the selection step and selecting the bituminous mixture is based on the determination. Preferably, the dust/bitumen ratio of the at least one bituminous mixture is determined before the selection step and selecting the bituminous mixture is based on the determination.

In another embodiment of the present invention, the bituminous mixture has at least about 3% air voids, an Air Permeability Value that is at least about 10 cm$^2$, and a Flexural Beam Fatigue of at least about 5000 cycles at 2000 microstrains, 10 Hz, and 20° C. Preferably, the bituminous mixture has at least about 5% air voids and has a Flexural Beam Fatigue of at least about 35,000 cycles. Most preferably, the bituminous mixture has a Flexural Beam Fatigue of at least about 100,000 cycles at 2000 microstrains, 10 Hz, and 20° C.

In another embodiment of the present invention, the bituminous mixture includes at least about 7% bituminous binder. The mixture as has an Air Permeability Value that is at least about 8 cm$^2$ and no more than about 70% voids filled with bitumen.

Another embodiment of the present invention is a fatigue-resistant and vapor-permeable layer of a roadway that includes no more that about 5% by mass of the aggregate in the bituminous mixture able to pass through a 75 µg sieve and more than about 70% by mass able to pass through a 2.36 mm sieve, an Air Permeability Value of at least about 8 cm$^2$, and a Flexural Beam Fatigue of at least about 5000 cycles at 2000 microstrains, 10 Hz, and 20° C. Preferably, more than about 80% by mass of the aggregate in this bituminous mixture is able to pass through a 2.36 mm sieve, and most preferably, more than about 85% by mass of the aggregate in this bituminous mixture is able to pass through a 2.36 mm sieve. Preferably, no more than about 70% voids in this layer are filled with bitumen. Preferably, this layer has at least about 18% VMA. Preferably, at least about 90% by mass of the aggregate is able to pass through a 9.5 mm sieve and substantially all of the aggregate is able to pass through a 12.5 mm sieve.

A fatigue-resistant, substantially water-impermeable, substantially vapor-permeable layer of a roadway may be created from the bituminous mixture of the present invention. This bituminous mixture can be used for various paving applications. It can be used to make base layers, interlayers, and overlays. Paved layers created with the bituminous mixture of the present invention have a reduced propensity for blistering during and after construction. In addition, the ability of such layers to relax stress is not overly compromised. Thus, such layers have the ability to retard the formation and severity of reflective cracks. Further, such layers are durable. The bituminous mixture of the present invention can be placed on a roadway with conventional equipment.

The following is an example of a paved area using a bituminous mixtures of the present invention that has been compared with an invented interlayer similar to what is described in U.S. Pat. No. 6,830,408. This example is not meant in any way to limit the scope of this invention.

EXAMPLE 1

A paved interlayer of a preferred embodiment of the present invention, which will be referred to as Section 1, was constructed on K-15 in Wichita, Kans. between I-35 and the Kansas Turnpike bridge. Section 2 was built on I-435 in Kansas. It encompassed an interlayer that did not have significant vapor permeability and closely resembled the interlayer described in U.S. Pat. No. 6,830,408. An overlay of PG 70-28 asphalt was placed over both interlayer sections.

The interlayer of Section 1 was one-inch thick and contained an average of 8.5% by weight binder. Section 2 included a one-inch interlayer averaging 9.3% by weight binder. The gradations of aggregate used in the interlayers of Sections 1 and 2 are shown in Table 1 below:

TABLE 1

| Gradations (sieve sizes) | Section 1 (% passing) | Section 2 (% passing) |
|---|---|---|
| 9.5 mm | 100 | 100 |
| 4.75 mm | 98 | 96 |
| 2.36 mm | 80 | 76 |
| 1.18 mm | 58 | 57 |
| 600 μm | 37 | 39 |
| 150 μm | 4 | 11 |
| 75 μm | 2.3 | 9 |

Characteristics of the bituminous mixtures used in Sections 1 and 2 are shown in Table 2 below:

TABLE 2

| | Section 1 | Section 2 |
|---|---|---|
| % binder (target) | 8.5 | 9.8 |
| % Air voids @ 50 gyrations | 5.1 | 1.3 |
| % voids in the mineral aggregate - VMA | 20.9 | 19.6 |
| Dust/bitumen ratio | 0.3 | 1.1 |
| Beam Fatigue Cycles (at 2000 microstrains, 10 Hz and 20° C.) | >170K | >100K |
| Air Permeability Value (cm$^2$) | 17 | 1.5 |

The example above details the use of substantially equivalent aggregate material and binders on both experimental sections. The projects were built on substantially similar concrete structures, in similar climatic areas and high traffic volumes. Section 1 constructed well and has performed well. Section 2 trapped water vapor between the substantially vapor impermeable interlayer and the concrete causing extreme blistering. The extreme blistering necessitated the complete removal of the interlayer.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

We claim:

1. A bituminous mixture comprising:
    a mixture formed by mixing aggregate and a bituminous binder,
    said aggregate having no more than 5% passing through a 75 μm screen and at least 70% passing through a 2.36 mm screen,
    said binder being at least 7% of the mixture, and
    said mixture having a dust to asphalt ratio of less than 09.

2. The bituminous mixture of claim 1 wherein said bituminous mixture has an Air Permeability Value that is at least 8 cm$^2$.

3. The bituminous mixture of claim 1 wherein said bituminous mixture has an Air Permeability Value that is at least about 10 cm$^2$.

4. The bituminous mixture of claim 1 wherein said bituminous mixture has a Flexural Beam Fatigue of at least 5000 cycles at 2000 microstrains, 10 Hz, and 20° C.

5. The bituminous mixture of claim 1 wherein said bituminous mixture has a Flexural Beam Fatigue of at least 35,000 cycles at 2000 microstrains, 10 Hz, and 20° C.

6. The bituminous mixture of claim 1 wherein said binder has a film thickness that is at least about 7 μm.

7. The bituminous mixture of claim 1 wherein said bituminous mixture has at least about 3% air voids.

8. The bituminous mixture of claim 1 wherein more than 85% of said aggregate is able to pass through a 2.36 mm sieve.

9. The bituminous mixture of claim 1 Wherein no more than 7% of said aggregate is able to pass through a 150 μm sieve and least 90% is able to pass through a 9.5 mm sieve.

10. The bituminous mixture of claim 1 wherein said bituminous mixture has at least 5% air voids.

11. The bituminous mixture of claim 1 wherein said bituminous mixture has no more than 70% voids filled with bitumen.

12. The bituminous mixture of claim 1 wherein no more than 25% of said aggregate is able to pass through a 600 μm sieve 13. The bituminous mixture of claim 1 wherein said bituminous mixture has at least 18% VMA.

14. A method for making a bituminous mixture comprising:
    mixing aggregate with bitumen with the aggregate having no more than 5% passing through a 75 μm screen and at least 70% passing through a 2.36 mm screen and with the binder being at least 7% of the mixture and the mixture having a dust to asphalt ratio of less than0.9%.

15. The method of claim 14 wherein said bituminous mixture has an Air Permeability value that is at least 8 cm$^2$.

16. The method of claim 14 wherein said bituminous mixture has an Air Permeability value that is at least 10 cm$^2$.

17. The method of claim 14 wherein said bituminous mixture has a Flexural Beam Fatigue of at least 5000 cycles at 2000 microstrains,10 Hz, and 20° C.

18. The method of claim 14 wherein Said bituminous mixture has a flexural beam fatigue of at least 35,000 cycles at 2000 microstrains,10 Hz, and 20° C.

19. The method of claim 14 wherein said binder has a film thickness that is at least 7 μm 20. The method of claim 14 wherein said bituminous mixture has at least 3% air voids.

21. The method of claim 14 wherein more than 85% of said aggregate is able to pass through a 2.36 mm sieve.

22. The method of claim 14 wherein no more than 7% of said aggregate is able to pass through a 150 μm seive and at least 90% is able to pass through a 9.5 mm sieve.

23. The method of claim 14 wherein said bituminous mixture has at least 5% air voids.

24. The method of claim 14 wherein said bituminous mixture has no more than 70% voids filled with bitumen 25. The method of claim 14 wherein no more than 25% of said aggregate is able to pass through a 600 μm sieve.

26. The method of claim 14 wherein said bituminous mixture has at least 18% VMA.

27. A method of selecting a bituminous mixture for making a layer for a roadway, comprising:
   providing aggregate wherein no more than 5% by weight of the aggregate passing through a 75 μm screen and at least 70% by weight of the aggregate passing through a 2.36 mm screen;
   providing at least one bituminous mixture comprised of a bituminous binder and said aggregate, said binder being at least 7% of the mixture and said mixture having a dust to asphalt ratio of less than 0.9% ;
   performing at least one of a fatigue test and a permeability test on said at least one bituminous mixture; and
   selecting a bituminous mixture for said layer after performing the at least one of said fatigue and permeability tests based on at least one or fatigue and permeability performance of said at least one bituminous mixture, wherein aggregate in said selected bituminous mixture is sufficiently large so as to create at least 3% air voids in said bituminous mixture and allow for substantial permeability in said mixture.

28. The method of claim 27 wherein at least 90% by mass of said aggregate in said selected bituminous mixture is able to pass through a 9.5 mm sieve, and substantially all of said aggregate in said selected bituminous mixture is able to pass through a 12.5 mm sieve.

29. The method of claim 27, further comprising:
   determining amount of voids filled with bitumen in said at least one bituminous mixture before said selection step and selecting said bituminous mixture based on said determination.

30. The method of claim 27, further comprising:
   determining amount of air voids in said at least one bituminous mixture before said selection step and selecting said bituminous mixture based on said determination.

31. The method of claim 27, further comprising:
   determining dust/bitumen ratio of said at least one bituminous mixture before said selection step and selecting said bituminous mixture based on said determination.

32. A fatigue-resistant and vapor-permeable layer of roadway, comprising a mixture of:
   aggregate, wherein no more than about 5% by mass of said aggregate is able to pass through a 75 μm sieve and more than about 70% is able to pass through a 2.36 mm sieve; and
   a bituminous binder, said binder being at least 7% of said layer and said layer having a dust to asphalt ratio of less than 0.9% ; and
   wherein said layer as an Air Permeability value of at least 8 $cm^2$ and has a Flexural beam Fatigue of at least 5000 cycles at 2000 microstrains, 10 Hz, and at 20° C in the first 24 hours after being placed.

33. The layer of claim 32 wherein said bituminous mixture has no more than 70% voids filled with bitumen.

34. The layer of claim 32 wherein said layer has at least 18% VMA.

* * * * *

UNITED STATES PATENT AND TRADEMARK OFFICE
CERTIFICATE OF CORRECTION

| | |
|---|---|
| PATENT NO. | : 7,479,185 B2 |
| APPLICATION NO. | : 11/195900 |
| DATED | : January 20, 2009 |
| INVENTOR(S) | : Blankenship et al. |

Page 1 of 1

It is certified that error appears in the above-identified patent and that said Letters Patent is hereby corrected as shown below:

Claim 1, Column 10, line 2, please change "09" to --0.9--

Signed and Sealed this

Twenty-first Day of September, 2010

David J. Kappos
*Director of the United States Patent and Trademark Office*